(12) United States Patent
Farrar et al.

(10) Patent No.: US 7,021,006 B2
(45) Date of Patent: **\*Apr. 4, 2006**

(54) QUICK RELEASE SACRIFICIAL SHIELD FOR WINDOW ASSEMBLY

(75) Inventors: Jerry L. Farrar, Banning, CA (US); Jesse E. Shepard, Corona, CA (US)

(73) Assignee: Transit Care, Inc., Panorama City, CA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 10/760,700

(22) Filed: Jan. 20, 2004

(65) Prior Publication Data

US 2004/0154228 A1 Aug. 12, 2004

Related U.S. Application Data

(63) Continuation of application No. 10/057,617, filed on Jan. 23, 2002, now Pat. No. 6,688,044, which is a continuation of application No. 09/395,692, filed on Sep. 13, 1999, now Pat. No. 6,408,574, which is a continuation-in-part of application No. 09/186,513, filed on Nov. 4, 1998, now Pat. No. 6,205,723.

(51) Int. Cl.
| | |
|---|---|
| *E05F 11/38* | (2006.01) |
| *E06B 7/16* | (2006.01) |
| *E06B 3/00* | (2006.01) |

(52) U.S. Cl. ............................. 49/375; 49/62; 49/489.1; 52/204.5

(58) Field of Classification Search ................... 49/375, 49/62, 489.1, 374, 351, 376, 50, 57, 496.1, 49/463, 466; 52/204.5, 208, 204.597, 204.7, 52/204.53, 204.54; 296/146.15
See application file for complete search history.

(56) References Cited

U.S. PATENT DOCUMENTS

| | | | |
|---|---|---|---|
| 1,533,731 A | 4/1925 | Foley | |
| 1,605,583 A | 11/1926 | Heymer | |

(Continued)

FOREIGN PATENT DOCUMENTS

| | | |
|---|---|---|
| DE | 2038176 | 9/1971 |
| EP | 106 629 | 4/1984 |

(Continued)

OTHER PUBLICATIONS

Re–Examination Documents Corresponding to U.S. Pat. No. 6,688,044 (Application No. 90/007,704) Sep. 2005.

*Primary Examiner*—Hugh B. Thompson, II
(74) *Attorney, Agent, or Firm*—Knobbe, Martens, Olson & Bear, LLP (57) ABSTRACT

Disclosed is a window assembly for use in mass transit vehicles which allows the quick and easy removal and replacement of transparent sacrificial glazing panels which protect the glazing of the window from vandalism and wear. The window assembly utilizes a sacrificial protective panel and mounting arrangement which allows quick and easy replacement of protective panels on one or both sides of the window assembly, but inhibits removal by non-maintenance personnel such as vandals. The frame of the window assembly incorporates one or more retainers which fit into slots along the interior sides of the window frame and sandwich the glazing between the frame and the retainers. In turn, the retainers are essentially "locked" into position in the frame by an inner protective panel, which significantly inhibits the removal of the retainers from the window assembly when the protective panel is in its desired position against the windowpane. Once the inner protective panel is removed from the window assembly, however, the retainers and glazing can quickly and easily be removed from the frame, allowing the glazing and any remaining protective panels to be quickly and easily removed from the frame.

36 Claims, 5 Drawing Sheets

U.S. PATENT DOCUMENTS

| | | |
|---|---|---|
| 1,740,960 A | 12/1929 | Roberge |
| 1,828,515 A | 10/1931 | Stone |
| 1,945,742 A | 2/1934 | Hilger |
| 1,973,792 A | 9/1934 | Barrows |
| 1,977,899 A | 10/1934 | Shapiro et al. |
| 2,163,566 A | 6/1939 | Blessin |
| 2,191,500 A | 2/1940 | Rosling |
| 2,193,852 A | 3/1940 | Axe |
| 2,221,005 A | 11/1940 | Reese |
| 2,267,542 A | 12/1941 | Walz |
| 2,371,430 A | 3/1945 | de Patto |
| 2,402,112 A | 6/1946 | Wilkinson |
| 2,667,378 A | 1/1954 | Holme-Shaw |
| 2,572,764 A | 2/1957 | Lyon |
| 2,780,846 A | 2/1957 | Ellis |
| 2,966,707 A | 1/1961 | Ellis |
| 3,004,305 A | 10/1961 | Goodemote et al. |
| 3,016,952 A | 1/1962 | Shero |
| 3,025,098 A | 3/1962 | Andrews |
| 3,055,468 A | 9/1962 | Horejs et al. |
| 3,136,396 A | 6/1964 | Sullivan |
| 3,140,115 A | 7/1964 | Bliss |
| 3,222,734 A | 12/1965 | Punt |
| 3,226,779 A | 1/1966 | Rust |
| 3,245,182 A | 4/1966 | Zierold |
| 3,266,560 A | 8/1966 | Mooskian |
| 3,312,023 A | 4/1967 | Zell |
| 3,349,517 A | 10/1967 | Johnson |
| 3,356,798 A | 12/1967 | Dodgen et al. |
| 3,363,390 A | 1/1968 | Crane et al. |
| 3,381,416 A | 5/1968 | De Torres et al. |
| 3,449,863 A | 6/1969 | Koch Jr. |
| 3,455,080 A | 7/1969 | Meadows |
| 3,599,596 A | 8/1971 | Remus et al. |
| 3,656,798 A | 4/1972 | Dodgen et al. |
| 3,667,179 A | 6/1972 | Elsenberg |
| 3,668,808 A | 6/1972 | Perina |
| 3,676,956 A | 7/1972 | Taylor et al. |
| 3,680,276 A | 8/1972 | Wright et al. |
| 3,686,795 A | 8/1972 | La Barge |
| 3,704,563 A | 12/1972 | Waller |
| 3,727,664 A | 4/1973 | Mennuto |
| 3,745,704 A | 7/1973 | Covington |
| 3,774,363 A | 11/1973 | Kent |
| 3,783,543 A | 1/1974 | Hemgren |
| 3,824,753 A | 7/1974 | Anderson |
| 3,861,081 A | 1/1975 | Maskell |
| 3,869,198 A | 3/1975 | Ballentine |
| 3,923,339 A | 12/1975 | McDonald |
| 3,925,947 A | 12/1975 | Meyers et al. |
| 3,928,953 A | 12/1975 | Mazoni et al. |
| 3,939,620 A | 2/1976 | Bero |
| 3,959,941 A | 6/1976 | Smith |
| 3,971,178 A | 7/1976 | Mazzoni et al. |
| 4,021,980 A | 5/1977 | Wilfong |
| 4,042,004 A | 8/1977 | Kwan |
| 4,068,428 A | 1/1978 | Peterson, III |
| 4,100,325 A | 7/1978 | Summers et al. |
| 4,115,973 A | 9/1978 | Anderson |
| 4,196,545 A | 4/1980 | Korany et al. |
| 4,205,486 A | 6/1980 | Guarnacci |
| 4,248,018 A | 2/1981 | Casamayor |
| 4,261,649 A | 4/1981 | Richard |
| 4,262,960 A | 4/1981 | Fifer |
| 4,278,286 A | 7/1981 | Kiba et al. |
| 4,280,414 A | 7/1981 | Allshouse et al. |
| 4,292,771 A | 10/1981 | Ellis |
| 4,328,644 A | 5/1982 | Scott et al. |
| 4,331,359 A | 5/1982 | Sheldon |
| 4,332,412 A | 6/1982 | Nakazawa et al. |
| 4,333,283 A | 6/1982 | Ebata |
| 4,349,993 A | 9/1982 | Tanaka et al. |
| 4,358,488 A | 11/1982 | Dunklin et al. |
| 4,364,198 A | 12/1982 | Netti |
| 4,364,209 A | 12/1982 | Gebhard |
| 4,364,595 A | 12/1982 | Morgan et al. |
| 4,389,068 A | 6/1983 | Sengoku |
| 4,428,171 A | 1/1984 | Harbin |
| 4,430,831 A | 2/1984 | Kemp |
| 4,431,228 A | 2/1984 | Grise |
| 4,471,589 A | 9/1984 | Schmidlin |
| 4,472,914 A | 9/1984 | DeBoef et al. |
| 4,478,003 A | 10/1984 | Flett |
| 4,487,448 A | 12/1984 | Griffin |
| 4,494,342 A | 1/1985 | Decker |
| 4,531,335 A | 7/1985 | Mangan |
| 4,543,283 A | 9/1985 | Curtze et al. |
| 4,555,867 A | 12/1985 | Stibolt |
| 4,555,869 A | 12/1985 | Kenkel |
| 4,561,223 A | 12/1985 | Gold et al. |
| 4,562,666 A | 1/1986 | Young, III |
| 4,598,525 A | 7/1986 | Poore |
| 4,608,793 A | 9/1986 | Yost et al. |
| 4,608,796 A | 9/1986 | Shea, Jr. |
| 4,611,850 A | 9/1986 | Fujikawa |
| 4,663,885 A | 5/1987 | Stibolt |
| 4,673,609 A | 6/1987 | Hill |
| 4,715,513 A | 12/1987 | Shelton, Jr. |
| 4,723,809 A | 2/1988 | Kida et al. |
| 4,726,149 A | 2/1988 | Tryba |
| 4,763,454 A | 8/1988 | Brockhaus |
| 4,768,319 A | 9/1988 | Derner |
| 4,768,823 A | 9/1988 | Martinez |
| 4,785,583 A | 11/1988 | Kawagoe et al. |
| 4,788,796 A | 12/1988 | Matthews |
| 4,799,344 A | 1/1989 | Francis |
| 4,800,681 A | 1/1989 | Skillen et al. |
| 4,823,511 A | 4/1989 | Herliczek et al. |
| 4,835,927 A | 6/1989 | Michlovic |
| 4,924,628 A | 5/1990 | Ruby et al. |
| 4,940,622 A | 7/1990 | Leavitt, Sr. et al. |
| 4,967,507 A | 11/1990 | Visnic et al. |
| 4,989,912 A | 2/1991 | Furman |
| 4,991,349 A | 2/1991 | Barthelemy |
| 4,998,392 A | 3/1991 | Massarelli et al. |
| 5,002,326 A | 3/1991 | Westfield et al. |
| 5,046,284 A | 9/1991 | Harper |
| 5,050,348 A | 9/1991 | Kane et al. |
| 5,062,248 A | 11/1991 | Kunert |
| 5,081,793 A | 1/1992 | Mauro |
| 5,085,021 A | 2/1992 | Kunert |
| 5,101,596 A | 4/1992 | Moore |
| 5,123,211 A | 6/1992 | Schlicht et al. |
| 5,137,770 A | 8/1992 | Rothe et al. |
| 5,150,943 A | 9/1992 | Gold |
| 5,169,205 A | 12/1992 | James |
| 5,176,420 A | 1/1993 | Kato |
| 5,242,207 A | 9/1993 | Carson et al. |
| 5,339,568 A | 8/1994 | Hanemaayer |
| D350,322 S | 9/1994 | Carson et al. |
| 5,396,746 A | 3/1995 | Whitmer |
| 5,450,917 A | 9/1995 | Goddard |
| 5,509,711 A | 4/1996 | Gold |
| 5,522,191 A | 6/1996 | Wenner et al. |
| 5,525,177 A | 6/1996 | Ross |
| 5,529,366 A | 6/1996 | Gold |
| 5,546,704 A | 8/1996 | Maruoka |
| 5,546,714 A | 8/1996 | Kenkel |
| 5,551,195 A | 9/1996 | Vanderstukken |
| 5,570,548 A | 11/1996 | Hopper |
| 5,584,526 A | 12/1996 | Soldner |

| | | | | | | |
|---|---|---|---|---|---|---|
| 5,609,938 | A | 3/1997 | Shields | 6,131,339 A | 10/2000 | Ramus |
| 5,613,325 | A | 3/1997 | Mariel | 6,158,372 A | 12/2000 | Erskine |
| 5,635,281 | A | 6/1997 | Agrawal | 6,164,715 A | 12/2000 | Mosaner |
| 5,636,484 | A | 6/1997 | DeBlock | 6,205,723 B1 | 3/2001 | Farrar |
| 5,649,389 | A | 7/1997 | Coddens | 6,206,453 B1 | 3/2001 | Farrar |
| 5,671,491 | A | 9/1997 | Ladd | 6,250,028 B1 | 6/2001 | Caplette |
| 5,679,435 | A | 10/1997 | Andriash | 6,263,627 B1 | 7/2001 | Schonenbach et al. |
| 5,702,148 | A | 12/1997 | Vaughan et al. | 6,286,891 B1 | 9/2001 | Gage et al. |
| 5,735,089 | A | 4/1998 | Smith et al. | 6,312,043 B1 | 11/2001 | Blackburn et al. |
| 5,765,325 | A | 6/1998 | DeBlock | 6,397,662 B1 | 6/2002 | Alkhoury |
| 5,768,837 | A | 6/1998 | Sjoholm | 6,408,574 B1 | 6/2002 | Farrar et al. |
| 5,778,599 | A | 7/1998 | Saito | 6,419,298 B1 | 7/2002 | Farrar et al. |
| 5,809,707 | A | 9/1998 | Bargados et al. | 6,425,215 B1 | 7/2002 | Farrar |
| 5,820,201 | A | 10/1998 | Jabalee | 6,493,128 B1 | 12/2002 | Agrawal et al. |
| 5,848,496 | A | 12/1998 | Bertolini et al. | 6,585,311 B1 | 7/2003 | Farrar et al. |
| 5,893,600 | A | 4/1999 | McManus | 2002/0003356 A1 | 1/2002 | Davis et al. |
| 5,907,927 | A | 6/1999 | Lieb et al. | 2002/0184840 A1 | 12/2002 | Farrar et al. |
| 5,913,785 | A | 6/1999 | M.o slashed.ller et al. | 2003/0057733 A1 | 3/2003 | Carson et al. |
| 6,007,899 | A | 12/1999 | Yoshizawa et al. | | | |
| 6,010,180 | A | 1/2000 | Bureau et al. | | | |
| 6,012,257 | A | 1/2000 | Caplette | | | |
| 6,047,500 | A | 4/2000 | Caplette | | | |
| 6,105,973 | A | 8/2000 | Butler et al. | | | |

FOREIGN PATENT DOCUMENTS

| | | |
|---|---|---|
| GB | 715795 | 9/1954 |
| WO | WO 00/26048 | 5/2000 |

QUICK RELEASE SACRIFICIAL SHIELD FOR WINDOW ASSEMBLY

RELATED APPLICATIONS

The present application is a continuation of U.S. patent application Ser. No. 10/057,617 filed Jan. 23, 2002, entitled Quick Release Sacrificial Shield For Window Assembly now U.S. Pat. No. 6,688,044, issued Feb. 10, 2004, which was a continuation of U.S. patent application Ser. No. 09/395,692 filed Sep. 13, 1999, entitled Quick Release Sacrificial Shield For Window Assembly now U.S. Pat. No. 6,408,574, issued Jun. 25, 2002 which was a continuation-in-part of U.S. patent application Ser. No. 09/186,513, filed Nov. 4, 1998, entitled Quick Release Sacrificial Shield For Window Assembly now U.S. Pat. No. 6,205,723, issued Mar. 27, 2001.

FIELD OF THE INVENTION

The present invention relates to window assemblies and apparatus for protecting the glazing of motor vehicles. More particularly, the present invention relates to a window assembly for use in mass transit vehicles which allows the quick and easy removal and replacement of transparent sacrificial protective panels which protect the glazing of a window from vandalism and wear.

BACKGROUND OF THE INVENTION

A sacrificial protective panel is typically a relatively inexpensive transparent sheet of material, such as plastic, protecting a more expensive windowpane or glazing behind it. Generally of the same shape and size as the glazing they protect, sacrificial protective panels are typically positioned against the glazing, with the protective panel desirably absorbing any impact and/or damage directed towards the glazing. Desirably, any damage to the window assembly will be limited to the protective panel, which can be replaced at low cost, thereby significantly increasing the useful life of the window assembly. In addition, various types of solvents which cannot be used on the glass windowpane can often be used on the glazing panels to remove graffiti. Window assemblies employing sacrificial protective panels are commonly used in mass-transit vehicles, particularly buses and trains, where vandalism and wear to the glazing are problems. Use of sacrificial protective panels saves the cost and difficulty incurred with removing and replacing the complete window assembly.

Various types of sacrificial protective panels and mounting arrangements for windows of mass transit vehicles are well known in the art. For example, U.S. Pat. Nos. 5,242,207 and 5,735,089, which are incorporated herein by reference, describe and illustrate window protectors for use in mass transit vehicles. While these arrangements allow the use of sacrificing protective panels, the installation and replacement process of glazing panels in these arrangements is typically a time-intensive process which requires a number of specialized tools to complete. On the other hand, window assemblies incorporating easily-removable sacrificial panels typically also permit vandals to remove these same protective panels, significantly increasing the likelihood of damage to the glazing. In addition, where a protective panel is held in the window assembly by one or more exposed flexible mountings and/or gaskets, such mountings and/or gaskets can easily be damaged by vandals, necessitating expensive and time-consuming replacement of the mountings and/or gaskets as well as the remaining components of the window assembly.

Hence, there is continuing need for improved assemblies for protecting window glazing in mass transit vehicles from damage. While some of the existing assemblies do provide protection, some of the existing assemblies are often more difficult to manipulate such that replacement of the sacrificial protective sheets, or even the glazing itself, is complicated. Generally, it is preferable to be able to quickly replace all of the necessary protective sheets and glazing with a minimum of time and effort in order to keep maintenance costs at a minimum.

Further, existing window protection assemblies typically only protect the inner surface of the glazing. It will be appreciated, however, that both the inner surfaces and the outer surfaces of the glazing can be damaged thereby affecting the appearance of the window.

A need in the art exists, therefore, for a sacrificial protective panel and mounting arrangement in which the glazing panels can be quickly and conveniently replaced with a minimum of specialized tools, but in which the protective panel cannot easily be removed and/or the mounting assembly cannot easily be damaged by non-maintenance personnel. Moreover, this mounting assembly should also be suited for protecting both sides of the glazing of a window and still permit easy replacement and repair.

SUMMARY OF THE INVENTION

The aforementioned needs are satisfied by the window assembly of the present invention which, in one aspect, is comprised of a window assembly for a mass transporation vehicle that is comprised of a piece of glazing having a first e that is comprised of a piece of glazing having a first and a second side and first protective panel extending over and protecting the first side of the piece of glazing. The assembly also comprises a frame adapted to be mounted in the side wall of a mass transportation vehicle, wherein the frame defines an opening and is adapted to receive the piece of glazing so that the piece of glazing can be retained in the opening with the first protective panel positioned adjacent a first side of the piece of glazing. The frame in this aspect further defines a retaining surface located adjacent the first protective panel when the piece of glazing and the first protective panel is positioned within the opening. The assembly also includes a retainer that is positioned on the retaining surface such that the retainer retains the piece of glazing within the opening and wherein the retainer is adapted so that when the retainer is positioned on the retaining surface and the first protective panel and the piece of glazing are positioned within the opening, the first protective panel prevents removal of the retainer from the retaining surface.

Hence, in this aspect, unauthorized removal of the retainer is complicated as a result of the first protective sheet inhibiting such removal. However, in one embodiment, the protective panel can be moved in a direction parallel to the plane of the piece of glazing, preferably through the use of a specialized tool, such that the retainer can be removed from the frame thereby permitting removal of the piece of glazing from the opening.

In another aspect of the present invention, a window assembly for a mass transit vehicle is provided wherein the assembly is adapted to allow for protecting both sides of a piece of glazing. In this aspect, the window assembly includes a piece of glazing having a first and a second side and a first protecting panel and a second protective panel which respectively extend over and protect the first and second sides of the piece of glazing. The window assembly in this aspect includes a frame that defines an opening wherein the frame is adapted to be mounted in a wall of a mass transit vehicle and the frame is also adapted to receive the piece of glazing and the first and second protective panels so that the piece of glazing and the first and second protective panels can be retained in the opening. The assembly in this aspect also includes a retainer coupled to the frame wherein the retainer retains the glazing and the protective sheets in the opening of the frame so that the glazing is protected on both sides in the window.

Hence, in this aspect, both sides of a piece of glazing can be protected with protective sheets that are easily removed and replaced. In one embodiment, once the inner protective sheet and the retainer is removed, the glazing and the outer protective sheet can be lifted out of the opening in the frame into the interior of the mass transit vehicle. This allows for replacement protective panels to be installed into the frame.

From the foregoing it will be appreciated that the present invention allows for simplified installation and removal of protective panels positioned about the glazing of a window in a mass transit vehicle. These and other objects and advantages of the present invention will become more apparent from the following description taken in conjunction with the accompanying drawings.

DETAILED DESCRIPTION OF THE PREFERRED EMBODIMENT

Figure 1:
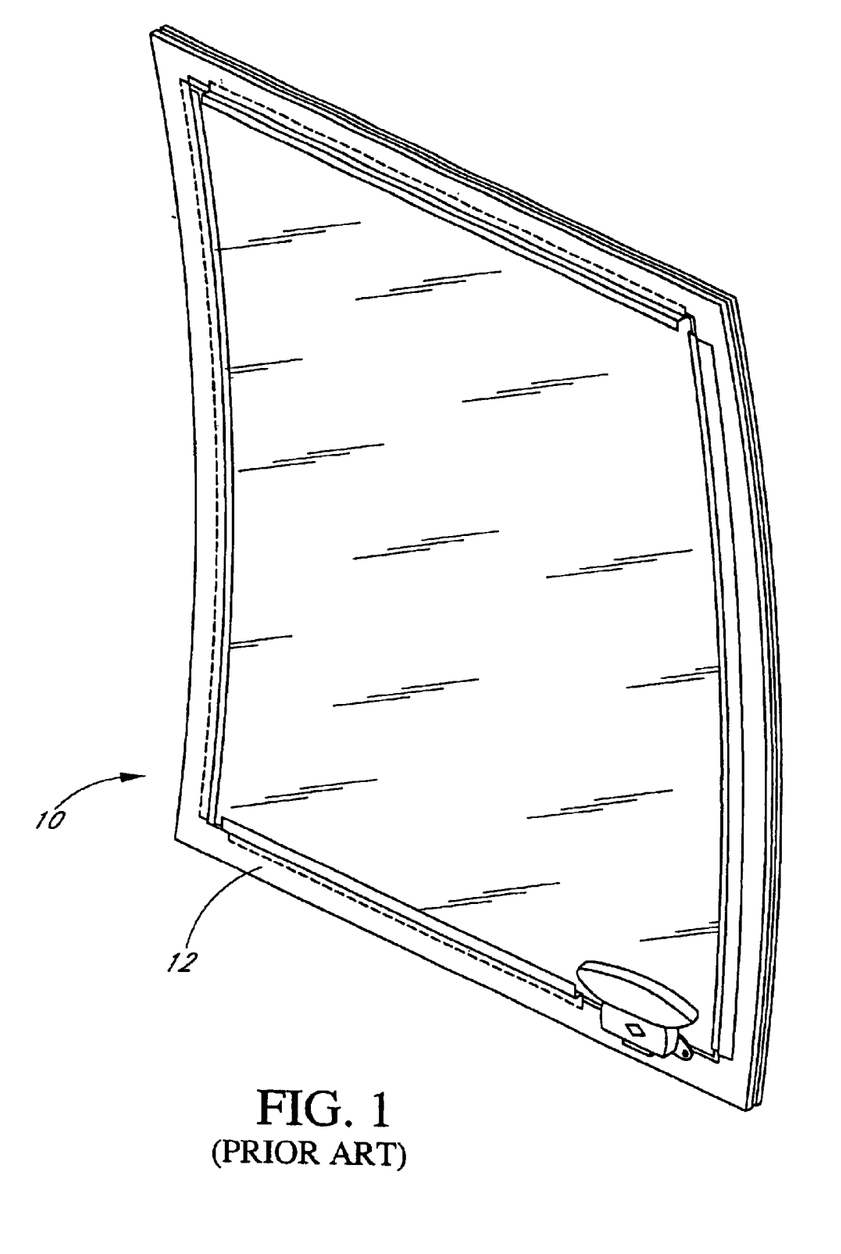
FIG. 1 is an elevated perspective view of a conventional window assembly for a mass-transit vehicle such as a bus or train.

FIG. 1 depicts a conventional window assembly 10 typically used in mass transit vehicles such as buses and/or trains. With initial reference to FIGS. 1–3, disclosed is one embodiment of a window assembly 10 constructed in accordance with the present invention. The window assembly 10 typically comprises a rectangular or regularly shaped closed frame 12, preferably comprised of metal or rigid plastic, which is mounted to the vehicle (not shown) or, alternatively, could be formed integrally with the vehicle. The frame 12 desirably comprises an inwardly-facing L-shaped support leg 18, which desirably extends about the entire periphery of the frame 12. In the disclosed embodiment, the support leg 18 comprises a transverse base 22 and an inwardly extending support face 24, substantially normal to the base 22, for receiving and supporting a corresponding L-shaped gasket 20. Preferably, the base 22 includes an elongated channel 26 for receiving a corresponding extension 28 from the gasket 20 to interlock the gasket 20 to the frame 12.

Figure 2:
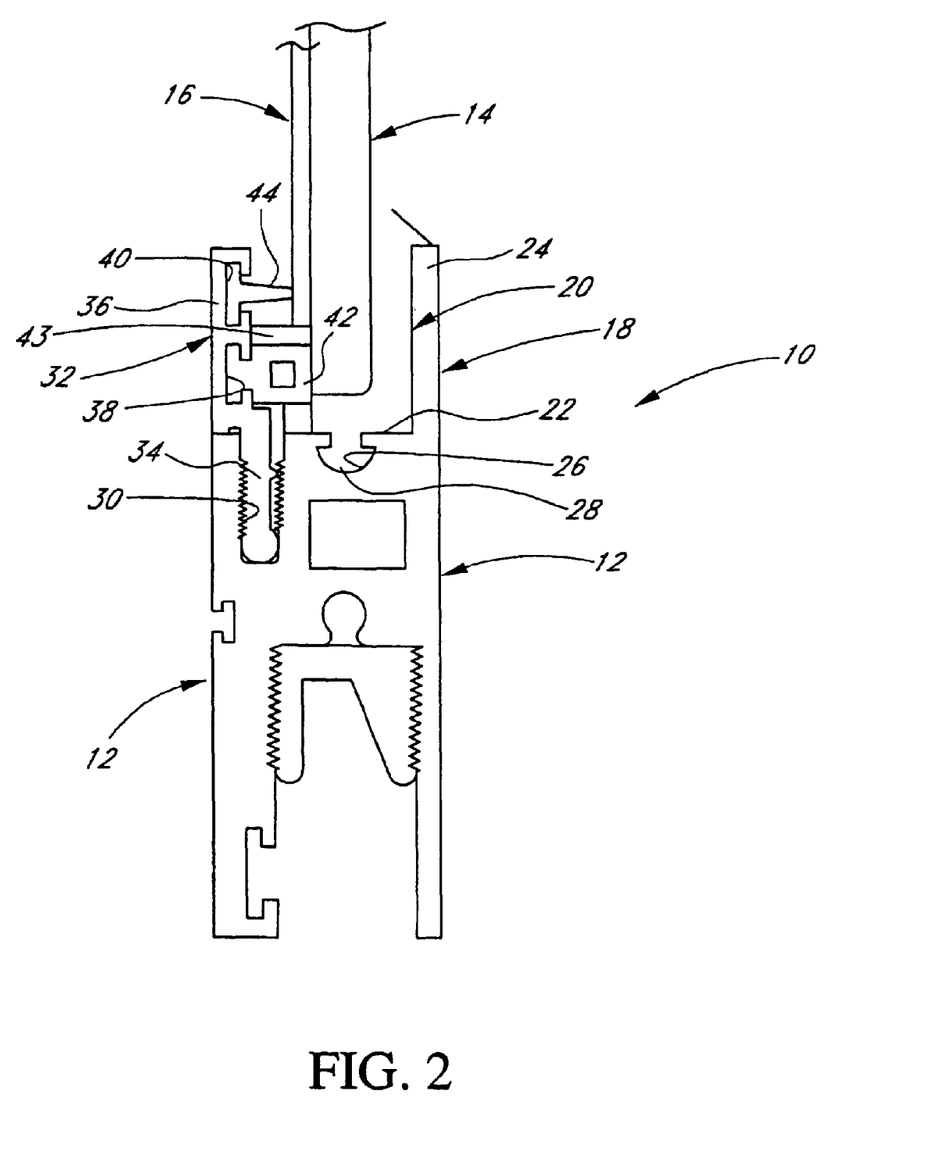
FIG. 2 is a partial sectional side view of a window assembly constructed in accordance with one embodiment of the present invention.
Figure 3:
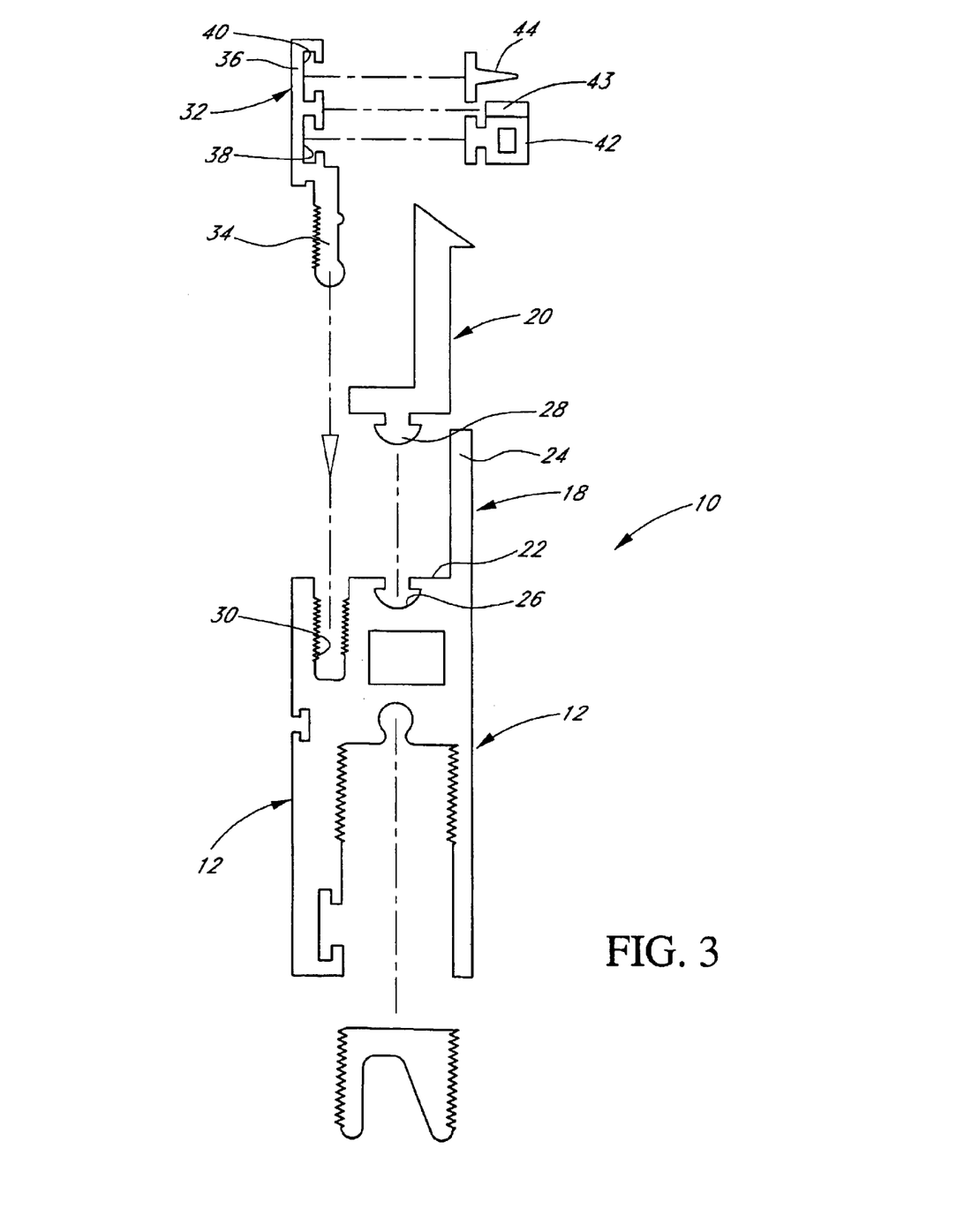
FIG. 3 is an exploded view of the window assembly of FIG. 2.

A piece of glazing 14 desirably sits within the gasket 20 which surrounds the periphery of the glazing 14 and desirably cushions the glazing 14 from vibrations and/or impacts experienced by the vehicle in a known manner. The transverse base 22 and support face 24 of the frame 12 and the gasket 20 desirably provide side support and an edge seal for an outside and marginal edge of the glazing 14 in the frame 12. In the disclosed embodiment, the glazing 14 is desirably equal to or smaller than the opening formed in the frame 12 by the L-shaped support legs 18.

A retainer 32 releasably secures the inner edge of the glazing 14 within the frame 12. As illustrated, the retainer 32 desirably comprises a vertically extending retention member 36 having a lower vertically extending leg 34 shaped to fit into an elongated pocket 30 formed in the frame 12. The retention member 36 further comprises a window gasket 42 a supplemental gasket 43 positioned on the upper surface of the window gasket 42 and a protective panel gasket 44, with these gaskets 42, 43, 44 desirably extending outward from the member 36 towards the glazing 14.

Preferably, the retainer 32 is formed of a resilient material such as aluminum, plastic or a composite material with the extending leg 34 including a serrated portion which mates with a serrated interior of the elongated pocket 30 to tightly yet releasably secure the retainer 32 to the frame 12. Of course, one skilled in the art would recognize that various other locking arrangements could be used to ensure positive retention of the retainer 32 within the pocket 30, such as interlocking ridges, hooks, or the like. In addition, the retention member 36 desirably includes elongated spaced side cavities 38 and 40, for releasably receiving the window gasket 42 and protective panel gasket 44, respectively.

When the retainer 32 is secured to the frame 12, with the lower leg 34 positioned within the elongated pocket 30, the lower surface of the glazing 14 is desirably sandwiched between the window gasket 42, the supplemental gasket 43 and the L-shaped gasket 20. These gaskets 42, 43 and 20 are desirably formed of an elastic material having good rebound characteristics, such as rubber, silicone or the like, which allow the window gasket 42 to be compressed against the glazing 14 when the retainer 32 is installed and/or removed from the frame 12, but rebounds and pushes against the glazing 14 when released, desirably securing the glazing 14 in position and biasing the serrated portions of the lower leg 34 and the elongated pocket 30 together.

As shown in FIG. 2, a sacrificial protective panel 16 is desirably positioned against the glazing 14 and inserted between the retainer 32 and the glazing 14. Desirably, the protective panel 16 slides between the protective panel gasket 44 and the glazing 14, with the lower edge of the protective panel 16 abutting against the supplemental gasket 43, such that the lower edge of the protective panel 16 prevents removal of the retainer 32 from the frame 12. Moreover, as previously noted, the presence of the protective panel 16 between the protective panel gasket 44 and the glazing 14 biases the serrated portions of the lower leg 34 and the elongated pocket 30 together. In this manner, the protective panel 16 is secured against the glazing 14 by the protective panel gasket 44, and the retainer 32 is secured within the frame 12.

In the embodiment disclosed, the protective panel gasket 44 is desirably T-shaped, a shape which desirably facilitates insertion and removal of the protective panel 16 from the frame 12. Of course, as well known in the art, a wide variety of alternate shapes and sizes of gaskets would accomplish the goals of the present invention, including triangular, rounded and/or angled gasket surfaces. Furthermore, the window gasket 42 desirably incorporates a flattened, partially flattened or curved surface facing towards the edge of the protective panel 16, an orientation which facilitates retention of the retainer 36 in the frame 12 by the protective panels 16. In addition, those skilled in the art will appreciate that a single gasket (not shown), incorporating the shapes of both the protective panel gasket 44 the window gasket 42 and the supplemental gasket 43, could be used in place of the gaskets 42, 43 and 44 with varying degrees of utility.

While not shown, the upper portion of the frame 12 may incorporate a similar retainer and frame arrangement as previously described, as may the right and left portions of the frame 12. Such arrangements would maximize the ease with which the glazing 14 and protective panel 16 could be removed and/or replaced in the window assembly 10. Alternatively, one or more of the edges of the window assembly 10 could be of conventional construction, incorporating permanent and/or semi-permanent retention walls. In such an arrangement, the glazing 14 would desirably slide between the permanent and/or semi-permanent retention walls of the window assembly 10, with the securing arrangement of the present invention being utilized on one or more edges to secure the glazing 14 into the window assembly 10.

If desired, the protective panel 16 can be installed into the window assembly 10 by various well known methods. For example, if the protective panel 16 is formed of a sufficiently flexible material, it may be initially flexed such that the edges of the panel 16 can be positioned against the glazing 14 at its edges, between the retainer(s). As the protective panel 16 is released, and resumes its unflexed shape, the protective panel 16 desirably passes between the retainer 32 and the glazing 14, where it desirably secures the retainer(s) 32 in the previously described manner. Such a protective panel 16 may be quickly and easily removed from the window assembly 10 using a suction gripping device (not shown), such as commonly used to transport windowpanes and mirrors.

Figure 4:
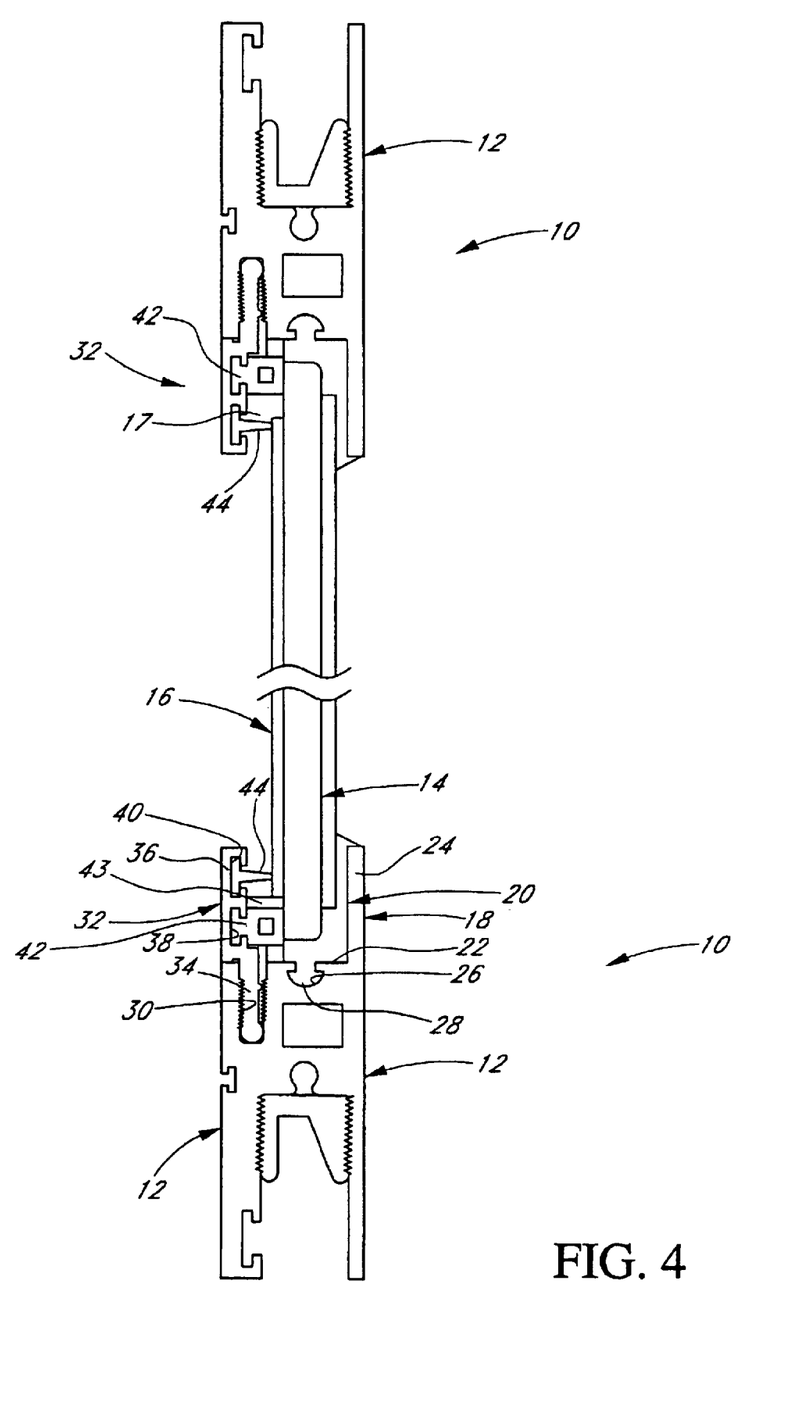
FIG. 4 is a sectional side view of a window assembly constructed in accordance with an alternate embodiment of the present invention.

Alternatively, a protective panel 16 could be installed into the window assembly 10 by providing a void in the upper edge of the window assembly 10, such as best seen in FIG. 4. In this alternate embodiment, the upper edge of the panel 16 may be inserted into the upper void 17, with the panel 16 being pushed between the glazing 14 and the protective panel gasket 44, into the void 17, until the lower edge of the protective panel 16 is raised sufficiently to pass over the retainer 32 and the protective panel 16 positioned adjacent the glazing 14. The protective panel 16 may then be pushed downward with the lower edge of the protective panel 16 passing between the protective panel gasket 44 and the glazing 14 in the previously-described manner, thus securing the retainer 32 into the frame 12.

As is illustrated in FIG. 4, in this embodiment, the upper window assembly 10 is substantially similar to the lower window assembly 10 in that it includes the frame member 12, the retainer 32, the window gasket 42 and the protective panel gasket 44. However, the upper window assembly 10, in this embodiment does not include the supplemental seal 43 in the space 17. Hence, there is space to allow the protective panel 16 to be moved with the suction cups (not shown) in the previously described manner so as to remove the lower edge of the protective panel 16 out from the space between the panel gasket 44 and the glazing 14.

Figure 5:
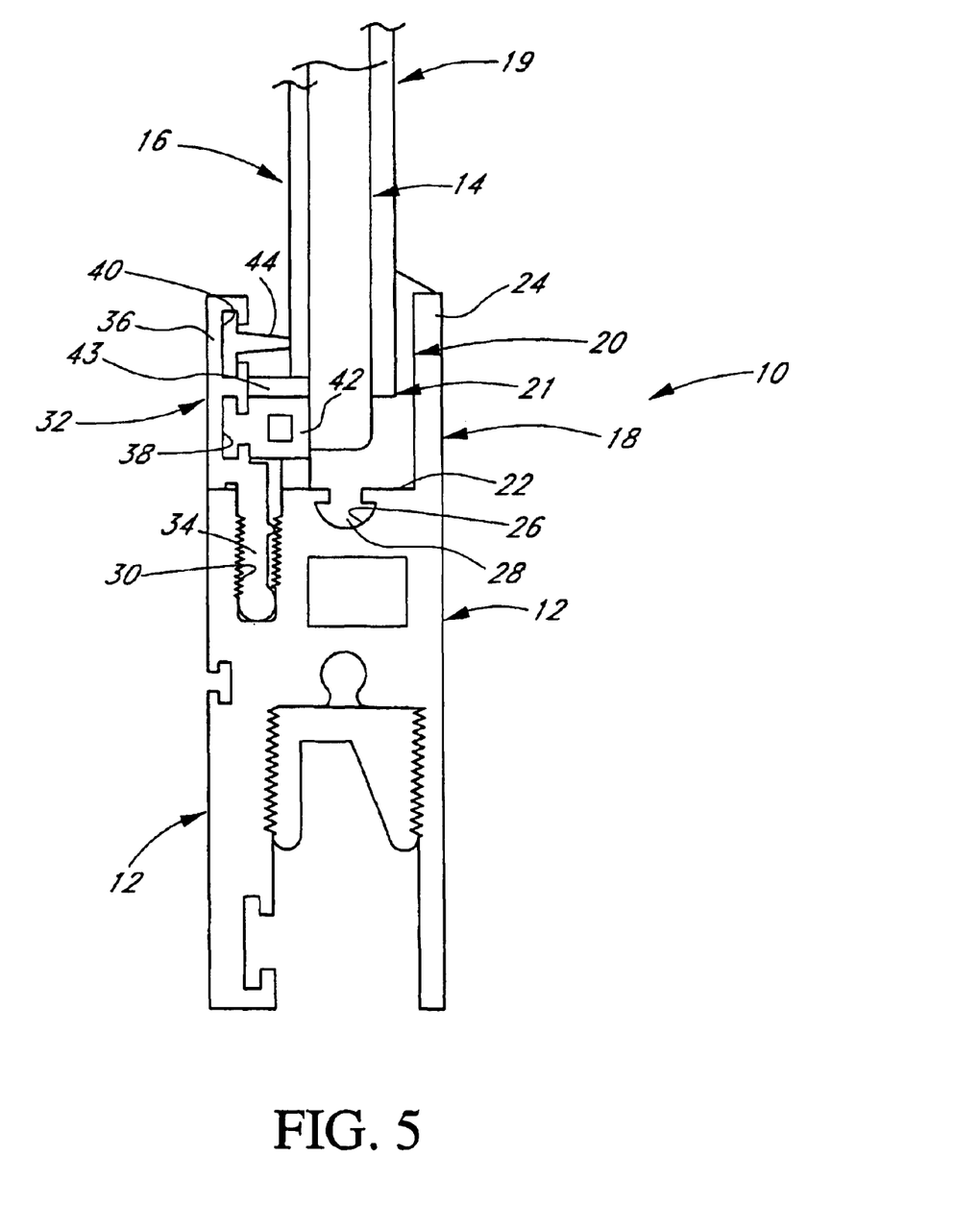
FIG. 5 is a sectional side view of a window assembly constructed in accordance with another alternate embodiment of the present invention.

FIG. 5 depicts a window assembly 10 constructed in accordance with an alternate embodiment of the present invention. Because the basic construction of this embodiment is essentially similar to the embodiments previously described, like reference numerals will be used for similar components.

In the embodiment of FIG. 5, the window assembly 10 incorporates both inner and outer protective panels 16 and 19. The outer protective panel 19 is desirably sandwiched between the glazing 14 and the L-shaped gasket 20, with an elongated notch 21 formed in the L-shaped gasket 20 to accommodate the outer edges of the outer protective panel 19.

Desirably, the outer protective panel 19 can be removed from the window assembly 10 by removing the glazing 14 in the previously-described manner and then removing the outer protective panel 19. In this manner, the inner protective panel 16 secures the window assembly 10 when desired, but allows the simple and easy removal of the inner and outer protective panels 16 and 19 and the glazing 14 when desired for maintenance.

One skilled in the art would appreciate that the disclosed window assembly, having outer and inner protective panels, could similarly be incorporated into a mass transit vehicle with the retainer members located on the outside of the window assembly, such that removal of the protective panels and retainer members could only be accomplished by individuals located outside of the vehicle. Such an arrangement would make it even more difficult for occupants of the vehicle to access and/or remove the retainer members from the window assembly, further limiting possible vandalism of the window frame assemblies while the vehicle is in operation.

From the foregoing description, it should be appreciated that the assembly and disassembly of the window assembly 10 and the attachment and removal of the protective panel 16 over the glazing 14 is easy and rapid. In particular, in assembly of the window assembly 10, the gasket 20 can be easily installed to the frame 12 via the channel 26 readying the frame 12 for reception of the glazing and any desired protective panels. With the glazing 14 and any outer protective panel in place, the retainer 32 is inserted into the frame 12 with the lower leg 34 of the retainer 32 seating in the pocket 30. The combination of frame 12, retainer 32 and gaskets 20 and 42 effects a positive weather seal. The inner protective panel 16 may then be inserted between the retainer 32 and the glazing 14, thereby securing the retainer 32 into the frame and inhibiting removal of the retainer 32 by non-maintenance personnel. In addition, the rigid surface of the retainer 32 facing towards the occupants of the vehicle desirably resists the effects of wear and/or vandalism, thereby significantly increasing the life of the window assembly 10. The removal of the glazing 14 is easily accomplished by removing the protective panel 16, removing the retainer 32 and then taking the glazing, i.e. glass, acrylic or other transparent and/or semi-transparent material, from the frame 12.

Although the foregoing description of the preferred embodiment of the present invention has shown, described and pointed out the fundamental novel features of the invention, it will be understood that various omissions, substitutions, and changes in the form of the detail of the apparatus as illustrated as well as the uses thereof, may be made by those skilled in the art, without departing from the spirit of the invention. Consequently, the scope of the present invention should not be limited to the foregoing discussions, but should be defined by the appended claims.

What is claimed is:

1. A window assembly for a mass transportation vehicle, the assembly comprising;

a piece of glazing having an inner and an outer side;
a first protective panel having a first and a second edge;
a frame having a first and a second section and defining an aperture wherein the frame is adapted to receive the piece of glazing so that the piece of glazing is retained in the aperture; and
a first and a second retainer disposed respectively on the first and the second sections of the frame wherein the first and second retainers respectively define a first and a second recess having a lip and a recessed surface into which the first and second edges of the first protective panel are positioned to thereby retain the first protective panel such that the first protective panel is positioned inward of the inner side of the piece of glazing, wherein the first edge rests on the recessed surface of the first recess when positioned inward of the inner side of the piece of glazing and wherein the protective panel is movable into the second recess a distance selected such that the first edge of the protective panel is exposed from the first recess to thereby permit removal of the first edge of the first protective panel from the first retainer.

2. The window assembly of claim 1, wherein the removal of the first edge of the first protective panel from the first retainer allows the removal of the second edge of the first protective panel from the second retainer thereby allow the first protective panel to be removed from the first and second retainers for replacement purpose.

3. The window assembly of claim 1, wherein each of the first and second sections of the frame defines an opening adapted to receive the corresponding retainer.

4. The window assembly of claim 3, wherein each of the first and second retainers defines a leg that is positioned in the opening defined by corresponding section of the frame.

5. The window assembly of claim 4, wherein the first edge of the first protective panel positioned inward of the inner side of the piece of glazing inhibits removal of the first retainer from the opening defined by the first section of the frame.

6. The window assembly of claim 1, wherein the first protective panel is positioned adjacent the inner side of the piece of glazing.

7. The window assembly of claim 6, wherein the first protective panel is positioned in contact with the inner side of the piece of glazing.

8. The window assembly of claim 1, wherein the first and second sections of the frame correspond to bottom and top of the frame respectively such that gravity urges the first edge of the protective panel against the recessed surface of the first recess.

9. A method of using a protective panel positioned inward of an inner side of a piece of glazing mounted in a frame of a mass transit vehicle window to protect the piece of glazing, the method comprising:
positioning a first edge of the protective panel into a first void defined by a first retainer located at a first section of the frame such that a second edge of the protective panel is positioned adjacent a lip of a second retainer;
positioning the second edge of the protective panel past the lip of the second retainer; and
moving the second edge of the protective panel into a second void at least partially defined by the second retainer until the second edge of the protective panel rests
on a recessed surface and so that the first edge of the protective panel is retained in the first void by the first retainer.

10. The method of claim 9, further comprising acts of:
moving the protective panel, when the protective panel is positioned in inward of the piece of glazing, such that the first edge of the protective panel is urged into the void so that the second edge of the protective panel is exposed with respect to the lip of the second retainer;
extracting the exposed second edge of the protective panel from the opening defined by the second retainer to thereby remove the protective panel for replacement purposes.

11. The method of claim 10, further comprising mounting the first and second retainers in the frame of the window.

12. The method of claim 11, wherein mounting the first and second retainers in the frame of the window comprises mounting the retainers such that the protective panel is positioned adjacent the inner surface of the piece of glazing.

13. The method of claim 12, wherein mounting the first and second retainers in the frame of the window further comprises mounting the retainers such that the protective panel is positioned in contact with the inner surface of the piece of glazing.

14. The method of claim 11, wherein mounting the first and second retainers in the frame of the window comprises positioning the retainers in openings defined in the frame.

15. The method of claim 9, wherein the first and second retainers are disposed at top and bottom of the frame respectively such that gravity urges the second edge of the protective panel against the recessed surface.

16. A window assembly for a mass transportation vehicle, the assembly comprising:
a piece of glazing having an inner and an outer side;
a first protective panel having a first and a second edge;
a frame having a first and a second section and defining an aperture wherein the frame is adapted to receive the piece of glazing so that the piece of glazing is retained in the aperture; and
one or more retainers disposed on the first and the second sections of the frame so as to define a first and a second recess having a lip and a recessed surface into which the first and second edges of the first protective panel are positioned respectively to thereby retain the first protective panel positioned inward of the inner side of the piece of glazing, wherein the second edge of the protective panel is movable into the second recess a distance sufficient to allow the first edge of the protective panel to be removed.

17. The window assembly of claim 16, wherein the removal of the first edge of the first protective panel from the first recess allows the removal of the second edge of the first protective panel from the second recess thereby allow the first protective panel to be removed from the one or more retainers for replacement purpose.

18. The window assembly of claim 16, wherein each of the first and second sections of the frame defines an opening adapted to receive the corresponding retainer.

19. The window assembly of claim 18, wherein each of the one or more retainers defines a leg that is positioned in the opening defined by corresponding section of the frame.

20. The window assembly of claim 19, wherein the first edge of the first protective panel positioned inward of the inner side of the piece of glazing inhibits removal of the corresponding retainer from the opening defined by the first section of the frame.

21. The window assembly of claim 16, wherein the first protective panel is positioned adjacent the inner side of the piece of glazing.

22. The window assembly of claim 21, wherein the first protective panel is positioned in contact with the inner side of the piece of glazing.

23. The window assembly of claim 16, wherein the first and second sections of the frame correspond to bottom and top of the frame respectively such that gravity urges the first edge of the protective panel into the first recess.

24. The window assembly of claim 16, wherein the one or more retainers comprise first and second retainers that are separate pieces and corresponding to the first and second sections of the frame.

25. The window assembly of claim 16, wherein the first edge of the first protective panel rests on the recessed surface of the first surface when the first protective panel is positioned and retained inward of the inner side of the piece of glazing.

26. The window assembly of claim 16, wherein the movement of the protective panel that allows the removal of the first edge of the protective panel from the first recess comprises a movement that exposes the first edge from the first recess.

27. A method of using a protective panel positioned inward of an inner side of a piece of glazing mounted in a frame of a mass transit vehicle window to protect the piece of glazing, the method comprising:

positioning a first edge of the protective panel into a first void defined by a first retainer located at a first section of the frame such that a second edge of the protective panel is positioned adjacent a lip of a second retainer;

positioning the second edge of the protective panel past the lip of the second retainer; and allowing the second edge of the protective panel to move into a second void at least partially defined by the second retainer until the second edge of the protective panel is retained in the second void by the second retainer and so that the first edge of the protective panel is retained in the first void by the first retainer.

28. The method of claim 27, further comprising acts of:

moving the protective panel, when the protective panel is positioned in inward of the piece of glazing, such that the first edge of the protective panel is urged into the first void by a distance sufficient to allow removal of the second edge of the protective panel from the second void;

extracting the second edge of the protective panel from the second void to thereby remove the protective panel for replacement purposes.

29. The method of claim 28, wherein moving the protective panel by the distance sufficient to allow removal of the second edge of the protective panel comprises moving the protective panel so as to expose the second edge of the protective panel with respect to the lip of the second retainer.

30. The method of claim 28, further comprising mounting the first and second retainers in the frame of the window.

31. The method of claim 30, wherein mounting the first and second retainers in the frame of the window comprises mounting the retainers such that the protective panel is positioned adjacent the inner surface of the piece of glazing.

32. The method of claim 31, wherein mounting the first and second retainers in the frame of the window further comprises mounting the retainers such that the protective panel is positioned in contact with the inner surface of the piece of glazing.

33. The method of claim 30, wherein mounting the first and second retainers in the frame of the window comprises positioning the retainers in openings defined in the frame.

34. The method of claim 27, wherein the first and second retainers are disposed at top and bottom of the frame respectively such that gravity urges the second edge of the protective panel into the second void.

35. The method of claim 27, wherein the first and second retainers comprise separate pieces.

36. The method of claim 27, wherein allowing the second edge of the protective panel to move into the second void so as to be retained therein comprises allowing the second edge of the protective panel to rest on a recessed surface of the second void.

* * * * *